F. J. Jones.
Belt-Hook.
Nº 76082.  Patented Mar. 31, 1868.
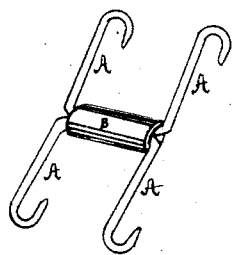
Witnesses  
H. S. Sprague  
George Ruhland
Inventor  
Frederick J Jones  
Per attorney  
T S Sprague

United States Patent Office.

FREDERICK J. JONES, OF DETROIT, MICHIGAN, ASSIGNOR TO HIMSELF AND ADOLPH DICK, OF SAME PLACE.

Letters Patent No. 76,082, dated March 31, 1868.

IMPROVED BELT-HOOK.

The Schedule referred to in these Letters Patent and making part of the same.

TO WHOM IT MAY CONCERN:

Know all men that I, FREDERICK J. JONES, of Detroit, in the county of Wayne, and State of Michigan, have invented a new and useful Improvement in Belt-Hooks; and I do declare that the following is a true and accurate description thereof, reference being had to the accompanying drawings, and to the letters of reference marked thereon, and being a part of this specification.

The nature of this invention is so to construct hooks for the purpose of fastening the ends of belts that the belts will not be cut or worn by the hooks, and that will allow the belt to be "taken up" much more easily and rapidly than can possibly be done by lacing, or by any of the other ordinary methods of fastening belts.

In order to accomplish this object, I construct two double hooks, A, the bends of which are connected by the loose sleeve B.

To use my invention, it is simply required to punch square or triangular holes through near the ends of the belt, to correspond with the hooks in their distance apart, when the hooks can be easily and rapidly applied.

What I claim as my invention, and desire to secure by Letters Patent, is—

The construction of a double hook and sleeve, substantially as and for the purposes herein set forth and described.

FREDERICK J. JONES.

Witnesses:
H. S. SPRAGUE,
J. W. HOUGHTELIN.